Figure 2:
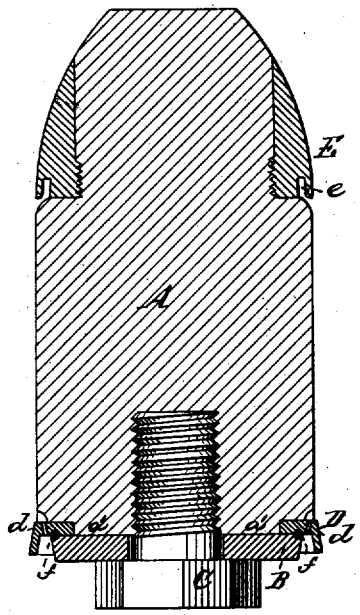
Figure 1:
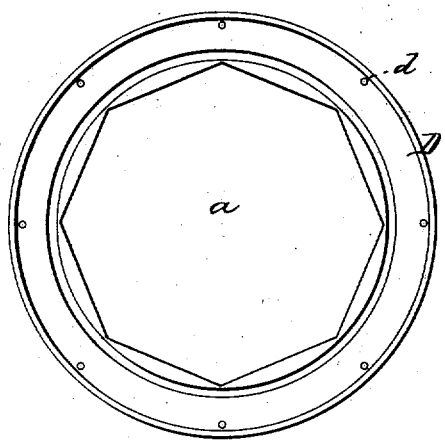
Figure 3:
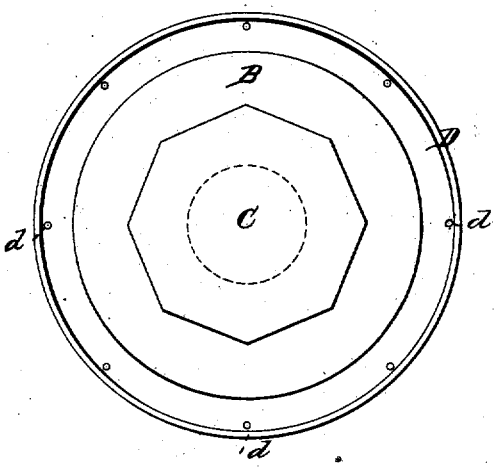
Figure 4:
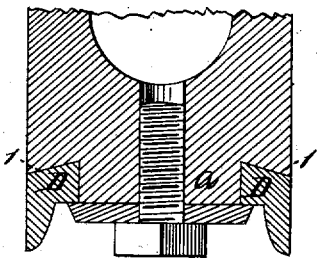

H. REILLY.

Projectile for Ordnance.

No. 8,308. Reissued June 25, 1878.

Witnesses
[illegible]
Burnett Graham

Inventor.
Hugh Reilly
by
Phillips Abbott
his Attorneys

N. PETERS, PHOTO-LITHOGRAPHER, WASHINGTON, D. C.

2 Sheets—Sheet 2.

H. REILLY.

Projectile for Ordnance.

No. 8,308. Reissued June 25, 1878.

Witnesses
[illegible]
[illegible]

Inventor
Hugh Reilly
by his Attorney
Phillips Abbott

N. PETERS, PHOTO-LITHOGRAPHER, WASHINGTON, D. C.

UNITED STATES PATENT OFFICE.

HUGH REILLY, OF BROOKLYN, NEW YORK.

IMPROVEMENT IN PROJECTILES FOR ORDNANCE.

Specification forming part of Letters Patent No. 165,255, dated July 6, 1875; Reissue No. 8,308, dated June 25, 1878; application filed January 28, 1878.

*To all whom it may concern:*

Be it known that I, HUGH REILLY, of Brooklyn, New York, have invented Improvements in Projectiles, of which the following is a specification:

My invention consists in improvements in projectiles for ordnance.

The first of my improvements relates to the form of the "sabot," or expansible ring at the base of the projectile, and in the method of attaching the same to the shot or shell.

My second improvement relates to an arrangement of gas-escapes through the sabot in such a manner that by the sabot's expansion the gas-escapes will not be closed, and the sabot will be less liable to break.

Reference being had to the accompanying drawings, in which like letters represent like parts, Figure I is a rear view of my improved sabot removed from the shot or shell. Fig. II is a section of a projectile cut in the plane of its axis, showing all my improvements. Fig. III is a rear view of the same. Fig. IV is a sectional view of the rear portion of the shot, the sabot, plate, bolt, &c., showing the forward face of the sabot resting against the slanting shoulder on the shot.

In projectiles for ordnance some arrangement has to be provided for enabling the shot to take the rifling, and thus receive the desired rotation upon its longitudinal axis. This is usually accomplished by screwing to the projectile, near its base, a thick ring of brass, into which, from the rear, is cut a very deep groove, thus making, as it were, a double ring, the outer part forming one side of the groove being thin and tapered in section, the inner part being thicker, and tapered but slightly upon the side which forms the inner portion of the circular groove. Upon the inside surface of this annular ring is cut a screw, by means of which it is attached to the rear portion of the projectile.

When the gun is fired, the outer thin edge is expanded by the force of the explosion, and is consequently driven into the grooves of the rifling, thus enabling the shot or shell to receive the rotary motion due to the rifling. The female thread for the attachment of this kind of sabot to the projectile is cut upon the ring, and the male thread upon the rear portion of the projectile, which has been previously reduced in diameter. These threads are large and costly to cut, both the projectiles and sabot having to be placed in a lathe for the purpose.

My improvement, as shown in the drawings, decreases the cost of the projectile, while an equally efficient arrangement is provided.

In Fig. II the sabot is shown at D, and in Fig. I it is shown detached from the shot or shell. The body of the projectile A, Fig. II, has at its rear end a projection, as seen at *a'*, the shape of which is more clearly shown by reference to Fig. I, where *a* is the opening in the sabot, corresponding in shape with the projection *a'*. The distance which *a'*, Fig. II, projects from the rear of the shot or shell is dependent upon the size of the projectile and the length of the sabot. The sabot D is made of brass or copper, or any other metal or compound may be used having the requisite pliability.

The rear part of the sabot D consists of a comparatively thin projecting edge or rim, which is to be expanded to fit the grooves of the rifling when the gun is fired. The forward part of the sabot is much thicker, and an opening, as at *a*, Fig. I, is cast or cut through it centrally, which opening may have eight sides, as shown, or may be any other many-sided figure. Into this opening *a* the projection *a'* at the rear of the shot or shell closely fits, the projection being sufficient to entirely fill the opening in the thick part of the sabot, the length of the projection from that part of the shot where its diameter is first diminished being equal to the length of the thick portion of the sabot.

A plate, B, Figs. II and III, smaller in diameter than the opening left by the rear projecting edges of the sabot D at their bottom, and equal in thickness to the length (measured in the axial line of the shot) of the cavity formed by the thin expansible edges of the sabot, is placed against the rear of the projection *a'* of the projectile, resting partly on the projection *a'*, which is, in fact, the real base of the projectile A, and partly on the thicker portion of the sabot, where it fits around the projection *a'* from the shot's base. The plate B is a portion of a cone cut at right angles to its axis. The part having the largest diameter is the forward portion, which rests against the sabot and shot, the rear portion of the plate being of slightly less diameter. Thus the opening left between the edges of the plate B and the thin projecting edges of the sabot D will be a groove, in which the sides approach but do not meet, being a V with the sharp point cut off.

This form of groove is adopted, as it is believed that a superior expansion of the thin edges of the sabot D is thus secured. This clamp-plate B thus serves to keep the sabot D firmly attached to the projectile A, the plate being in this case held in position against the shot or shell by a bolt, C; but some other method may be adopted of holding the plate B against the projectile A. I prefer, however, to use the bolt C for this purpose, because all shot, after a certain size, are hollow, in the manufacture of which it is necessary to have a hole through the rear portion, used for the support of the core to pass through while the shot is being cast. This hole is usually closed by a bolt, and when my improved sabot is used, the same bolt, only slightly larger, will serve to hold the clamp-plate B in position, saving the expense of cutting large screws, as already mentioned, or of forming other methods of attachment. I will mention, however, that the bolt C can be a portion of the plate B, which virtually will form its head, though much enlarged, to serve this special purpose.

The forward part of the sabot rests against the shoulder left when the rear projection *a'* was formed; and this shoulder is so made by being beveled inwardly and forwardly, as shown at 1, Fig. IV, (the forward part or face of the sabot D having a corresponding bevel,) that when the sabot D is in position and firmly held by the clamp-plate B, when the explosion of the charges takes place, the gases of combustion will tend to force the sabot forward by their impact against the rear portions of the sabot and upon the clamp-plate resting against the sabot, and thus the forward part or face of the sabot, resting against the slanting shoulder, will be jammed into the dovetail or acute angle formed by the slanting face of the shoulder and the sides of the projection *a'*, all around said projection *a'*, and thus the front portion of the sabot, being held firmly by the plate and the outer edge of the shoulder, will be confined, and will not expand at that point, and only the thin backwardly-extending portion or ring will expand into the rifling of the gun. This, in certain instances, is a very desirable end to be attained; but, on the contrary, it is sometimes desirable that the sabot should expand throughout its whole length. In such cases the beveled shoulder may be changed in the construction of the shot or shell, and the shoulder be made at right angles with the axial line of the projectile; and when it is desired to increase the expansion of the sabot throughout its entire length more than if the shoulder were at right angles to the axial line of the shot, then the shoulder on the shot and the front portion or face of the sabot resting on it may both be beveled inwardly and backwardly, so that the shoulder will slant outward, which will be just the reverse of Fig. IV. In either case, whether the shoulder and sabot are beveled outward or inward, the amount of bevel required will be very slight. About ten degrees will, in most cases, be sufficient, the angle being measured from a line running at right angles to the axial line of the projectile.

My second improvement consists in so arranging gas-escapes that the expansion of the sabot will not close them, and will not tend to break the sabot itself. In starting a heavy shot more powder has to be burned than can safely be absolutely confined, and a portion of the gases of combustion must be allowed to escape; an intentional windage must, in other words, be formed. This object has usually been attained by cutting slots in the outside surface of the sabot, and at times into the body of the shot itself, through which slots or grooves the gas might pass. These are liable to be, and usually are, entirely closed up by the expansion of the sabot.

In Figs. I, II, and III, at *d*, are seen the gas-escapes as arranged in my plan. The holes (eight, as shown in the drawing, or any greater or less number) are bored through the thickened forward part of the sabot, commencing at that part of the thick forward portion not covered by the edges of the clamp-plate B, and continuing through the sabot to its forward surface. These holes *d* would be closed, when the sabot D was in position, by the shoulder against which the sabot rests, were it not that either, just where these holes meet the shoulder, the metal of the body of the projectile is cut away, or the entire shoulder is chamfered off, thus permitting the gases in certain quantities to find, through *d*, a free escape from the base of the shot to a point in front of the expanded sabot.

It will be observed that the thin rear edge of the sabot may be expanded, or the sabot may expand through its whole length, and the gas-escapes *d* will not be closed, my method of boring them through a part of the sabot which is not materially affected by the explosion or expansion attendant thereon securing this beneficial result.

At E, I show an expansible ring, attached to the forward part of my projectile, which ring may be expanded by the passage of a portion of the gases of combustion through the gas-escapes *d*. This ring, when expanded, will keep the projectile truly centered during its passage along the bore of the gun, and may or may not be sufficiently expanded to take the grooves of the rifling. I have shown this ring as screwed to the metal of the projectile, the forward part of the body A having been sufficiently reduced in diameter to permit of this ring being placed upon the shot from the forward end. This is no part of my invention; but I have thus figured the device as a portion of a well-made projectile. The gas-escapes *d*, as described, are well adapted to be used with such a forward expansible ring, for, by their construction, they are less liable to be closed by explosion, and thus make the expansion of the ring E more certain.

In describing the clamp-plate B, I have omitted to state that some arrangement must be made to keep the gas from introducing itself between the plate B and the thick part of the sabot D directly in contact with it, for should this happen the clamp-plate would be forced from its position, and the sabot would separate itself from the shot. To avoid any such accident, I make a small groove in the part of the plate B which rests upon the sabot D, and I make a corresponding groove upon the sabot D. In one of these circular grooves I place a ring of soft metal, which may be circular in section, as seen at *f*, Fig. II, which will, when the plate B is attached to the projectile, be crushed into the groove between the sabot D and the plate B, making an effectual gas-check, and preventing the penetration of the products of combustion under the plate B. Other forms of gas-checks may be adopted. The parts of the plate B and sabot D which come in contact could be accurately faced in a lathe or other mechanism, such faced surfaces forming a close and gas-tight joint. If the clamp-plate B is attached to the projectile, as shown, by a bolt, C, similar methods may be followed in making a gas-tight joint between the head of the bolt C and the rear portion of the plate B. Other methods of attaching the plate B to the projectile A may be adopted which do not require the use of a bolt, C, and dispense with any necessity of gas-checks excepting the one shown at *f*. The clamp-plate B may be of iron, or of almost any material having sufficient strength.

My improved method of forming and fastening the sabot D to the projectile may be used by itself; or my improvement in the arrangement of gas-escapes may be used in a sabot as at present constructed. My improvements may be used together to produce a projectile of improved construction.

Having described my invention, what I desire to secure by Letters Patent, is—

1. A sabot with a backwardly-extending outer ring, expansible radially, in combination with the angular projection of the shot and the attaching-plate, substantially as and for the purposes specified.

2. A sabot provided with perforations to allow the escape of the gases of combustion, substantially as specified.

3. The body of a shot or shell having on its rear end a slanting shoulder, in combination with a ring-sabot having its front face slanting to correspond with the slant of the shoulder on the shot, so as to prevent expansion in that part of the sabot, and an attaching-plate, substantially as and for the purposes set forth.

4. As a new article of manufacture, a ring-sabot with its front face made on a slant inwardly and forwardly from the periphery of the sabot.

5. The packing-ring *f*, in combination with the body of a sabot and a clamp-plate.

HUGH REILLY.

Witnesses:

PHILLIPS ABBOTT,
JENNIE B. ABBOTT.